May 22, 1956 A. M. BRENNEKE 2,746,820
PISTON RING
Filed July 11, 1951
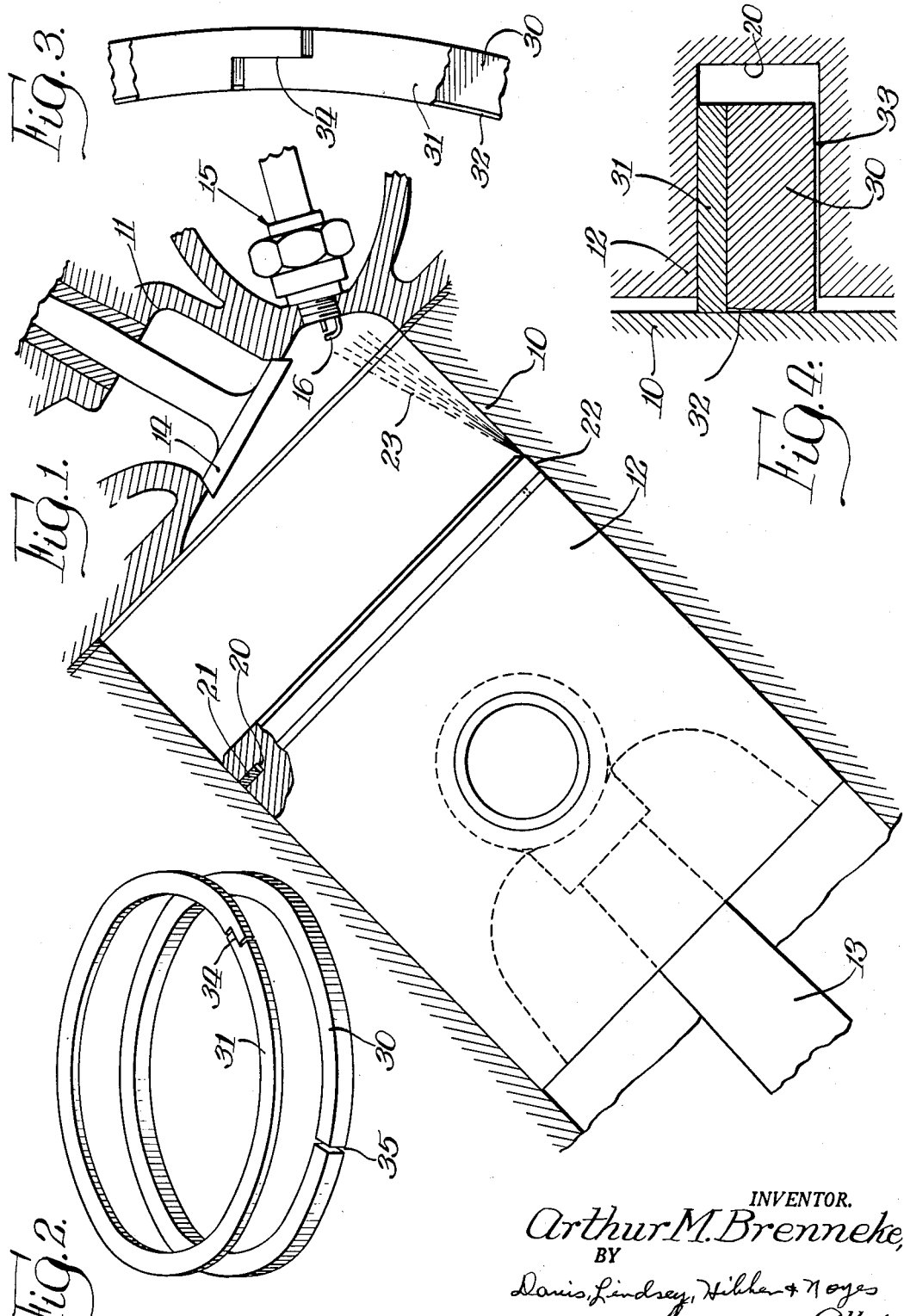
INVENTOR.
Arthur M. Brenneke,
BY
Davis, Lindsey, Hibben & Noyes
Attys.

United States Patent Office 2,746,820
Patented May 22, 1956

2,746,820
PISTON RING

Arthur M. Brenneke, New Castle, Ind., assignor to Perfect Circle Corporation, Hagerstown, Ind., a corporation of Indiana Application July 11, 1951, Serial No. 236,205

1 Claim. (Cl. 309—45)

The invention relates generally to piston rings and more particularly to a piston ring assembly adapted for use in an overhead valve type engine where a relatively high vacuum occurs on the suction stroke of each piston of the engine.

The general object of the invention is to provide a novel ring assembly which provides a highly effective seal with the cylinder wall and which prevents oil from passing radially outward from the ring groove to the clearance between the piston and cylinder above the ring.

Other objects and advantages will become apparent from the following description taken in connection with the accompanying drawing, in which:

Fig. 1 is a sectional view of an engine cylinder of the type herein contemplated and illustrating a difficulty now encountered with such an engine.

Fig. 2 is a perspective view of the two parts of a ring assembly embodying the features of the invention and adapted to substantially eliminate the difficulty illustrated in Fig. 1.

Fig. 3 is a fragmentary plan view of the ring assembly.

Fig. 4 is a radial sectional view, on an enlarged scale, of the ring assembly.

In the internal combustion engine used in some of the makes of automobiles now on the market, difficulty has been experienced in that the spark plugs become fouled with carbon in a relatively short period of time. After careful investigation, it was found that this was due to the fact that, on the suction stroke of the piston in each cylinder, oil would squirt through the gap in the upper ring from the back of the ring groove. The ring is free to shift rotatably in its groove in the piston, and when the ring gap shifted to a position in line with the spark plug, which is located at one side of the cylinder head, the oil flowing through the gap in the ring would spray upwardly into the cylinder head and on to the points of the spark plug, thereby fouling them. With the heat present, this oil was reduced to carbon.

To illustrate more specifically how this occurs, Fig. 1 of the drawing shows an axial sectional view of one of the cylinders in an engine of this type. The engine is of the V-type, and one cylinder of one of the two banks of cylinders is illustrated. Thus, in Fig. 1 the cylinder is shown at 10 and its head shown at 11. Within the cylinder is a piston 12 to which is secured the usual connecting rod 13. The cylinder head 11 carries the usual inlet and exhaust valves, one of which is illustrated at 14.

In this particular type of engine, the spark plug, indicated generally at 15, is mounted in the cylinder head 11 at the lower side of the cylinder, and its points are indicated at 16. As originally manufactured, the piston is provided with a groove 20 adjacent its upper end, in which a single ring 21 is mounted, the ring having a plain radial gap. The ring 21, of course, must fit in groove 20 in such a way that it is free to expand and contract so that it may maintain a proper engagement with the cylinder wall. With the ring thus being freely expansible and contractible in its groove, it is also free to shift rotatably about the piston so that at times the gap in the ring will shift to the lower side of the cylinder, which position is indicated at 22.

This particular engine operates with a relatively high vacuum on the suction stroke of the engine. Consequently, oil scraped by the ring from the cylinder wall and filling the back of the ring groove will be forced radially outward through the gap in the ring and thence upwardly past the upper portion of the piston and into the cylinder head. Such oil, when it passes beyond the upper end of the piston, takes the form of a spray, indicated at 23, and is deposited on the inner surface of the cylinder head 11. When the gap is shifted to the position 22 at the lower side of the cylinder, since the spark plug 15 is located at the lower side of the cylinder head, the points 16 thereof become coated with the oil. Because of the heat present in the subsequent power stroke, the oil becomes carbonized on the points 16 and thus interrupts the proper operation of the spark plug. While oil tends to squirt through the gap of the ring on every suction stroke of the piston, it is, of course, only when the gap in the ring is at the lower side of the cylinder in the position indicated at 22 that the oil is sprayed onto the points 16 of the spark plug. However, that seems to occur with sufficient frequency to cause interruption of the proper operation of the spark plug in much too short a time. The spraying of oil on the cylinder head at other points therein is also disadvantageous since it results in an undue deposit of carbon on the major portion of the interior surface of the cylinder head, but it interferes with operation most because of the deposit on the spark plug. The fact that this occurs in this particular type of engine is due, of course, to the relatively high vacuum occurring on the suction stroke.

The present invention provides a ring assembly which eliminates the difficulties heretofore described. This ring assembly comprises two members adapted to be located in the groove 20. One of these members, located at the lower side of the groove, is of such character that the oil is scraped from the cylinder wall with the maximum effectiveness. Both members are free to expand and contract and thus move relative to the side walls of the groove. With the clearance necessary for such action, a substantial quantity of the oil scraped from the cylinder wall will be transmitted to the space between the inner periphery of the ring assembly and the back of the groove. The other or upper member of the assembly fills the space between the first-mentioned member and the upper side of the groove and constitutes a circumferentially complete barrier to flow of oil radially from the inner part of the groove over the top of the first-mentioned member. Thus, the high vacuum occurring in this engine cannot cause any oil to flow from the back of the groove to the clearance above the ring assembly between the piston and the cylinder wall. Consequently, a minimum amount of oil reaches the space in the cylinder above the piston and as a result no fouling of the spark plug points occurs.

As shown in the drawing, my ring assembly comprises a lower member 30 and an upper member 31. In the preferred form, the lower member 30 is a ring of generally rectangular cross-sectional form having a tapered outer face 32 as clearly illustrated in Fig. 4. The tapered outer face is positioned so that contact thereof with the cylinder wall occurs at the lower side of the ring member 30. It is well-known that a tapered face ring is highly effective in scraping oil from the cylinder wall surface. The other member 31 is in the form of a steel rail made by bending a relatively thin strip of metal edgewise into substantially circular form and having its outer edge adapted to contact the cylinder wall above the point of contact of the tapered outer face 32 of the ring member 30. The invention, however, is not limited to an assembly in which the member 30 is of the taper face type but the member 30 may be of another type.

The two ring members 30 and 31 are freely expansible within the groove 20 so that they may closely follow the contour of the cylinder wall during the reciprocation of the piston. On the suction stroke of the piston, the downward movement of the latter, together with the friction occurring between the two ring members and the cylinder wall, as well as the pressure difference existing at that time, cause the ring member 30 to move against the ring member 31 and the latter to move against the upper side of the groove 20, leaving a slight clearance, indicated at 33 in Fig. 4, between the lower side of the ring member 30 and the lower side of the groove. Oil scraped from the cylinder wall by the ring member 30 thus may flow through this clearance 33 into the space between the inner periphery of the ring members and the back of the groove. Since relatively high vacuums occur on the suction stroke, there is a pressure difference between this space at the back of the groove and the space in the cylinder above the piston. If an ordinary straight gap were provided in the ring member 31, the oil would flow outwardly therethrough and the objectionable spraying of oil on the spark plug would occur.

To eliminate such action, the upper ring member 31 is provided with a stepped gap, indicated at 34 in Figs. 2 and 3, with the overlapping portions of the ends of the ring member in contact with each other. This eliminates any clear passage through the ring member 31 so that a circumferentially complete barrier to flow of oil radially outward is provided by the ring member 31. The ring member 31 thus may be said to be circumferentially uninterrupted to provide a seal against such radial flow of oil. The lower ring member 30 has an ordinary gap 35 but the chance of this gap being aligned with the stepped gap 34 in the upper member and also located at the lower position 22 of the cylinder in alignment with the spark plug is so slight that the difficulty is minimized. In actual practice it is found that such alignment of the two gaps at the location 22 so rarely occurs that formation of carbon on the spark plug points is substantially eliminated.

The taper face ring member 30 is particularly desirable in an engine of this character since the high vacuum creates a pressure condition under which oil tends to pass around the outer periphery of the ring structure. Consequently, the highly effective scraping action of the taper face ring is particularly useful in the present combination. However, the effective scraping action results in a large collection of oil in the back of the ring groove, which fact, together with the fact that the pressure conditions tend to draw the oil into the upper end of the cylinder, renders more important the provision of a circumferentially complete barrier against radial outward flow above the lower ring member 30, as provided by the upper ring member 31 with its stepped gap 34.

I claim:

A piston ring assembly for an internal combustion engine, comprising a pair of ring members in side-by-side relation, the ring member at the lower side of the ring groove having a tapered outer face providing an oil-scraping cylinder-engaging edge at its lower side, and the other ring member having a straight cylinder engaging face to prevent compression pressures from reaching the tapered face of the lower member and having a gap with portions in overlapping engagement to provide a circumferentially complete barrier to radial flow of oil from the inner portion of the groove between the first ring member and the upper side of the groove.

References Cited in the file of this patent

UNITED STATES PATENTS

| | | |
|---|---|---|
| 1,356,461 | Mummert | Oct. 19, 1920 |
| 1,410,727 | Anthony | Mar. 28, 1922 |
| 1,682,850 | Newton | Sept. 4, 1928 |
| 1,916,659 | Dodge et al. | July 4, 1933 |
| 1,942,967 | Marien | Jan. 9, 1934 |

FOREIGN PATENTS

| | | |
|---|---|---|
| 281,545 | Great Britain | Dec. 8, 1927 |
| 538,963 | Great Britain | Aug. 22, 1941 |